W. BACHMANN.
DOUGH BALLER.
APPLICATION FILED NOV. 2, 1918.
1,302,462.
Patented Apr. 29, 1919.
2 SHEETS—SHEET 1.
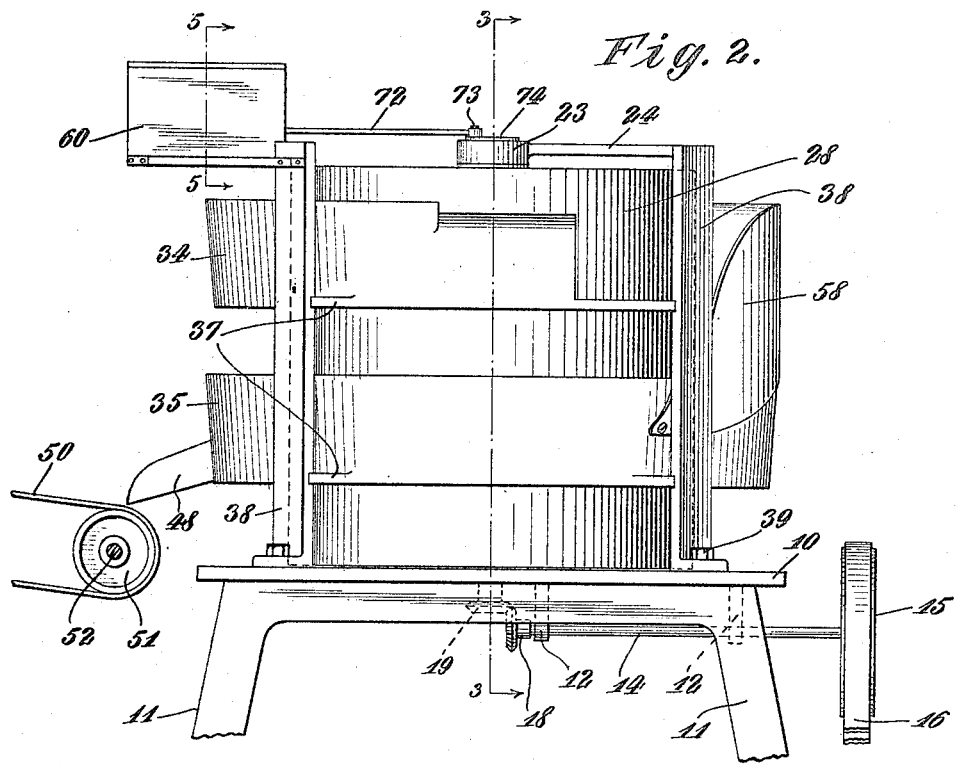
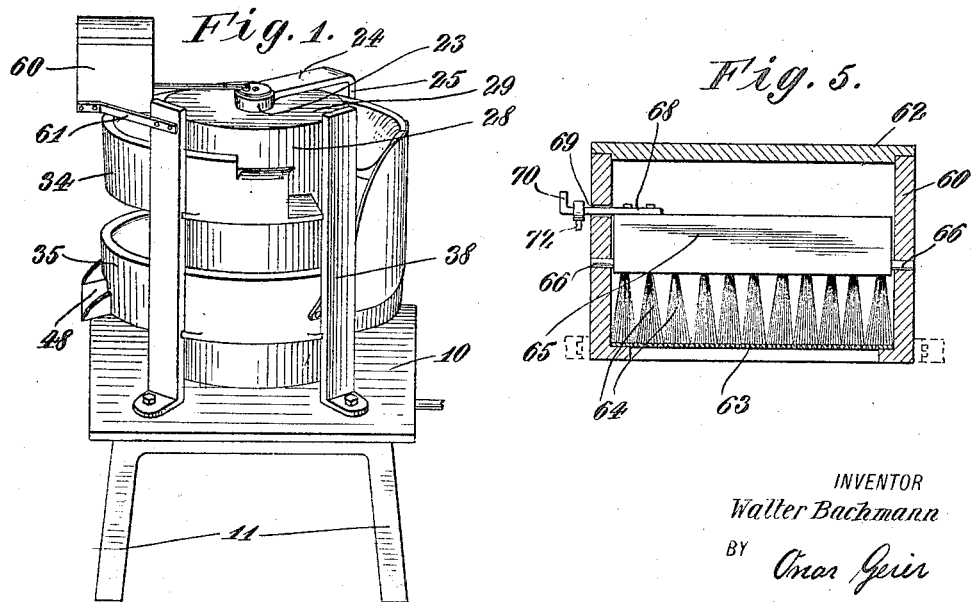
INVENTOR
Walter Bachmann
BY
his ATTORNEY

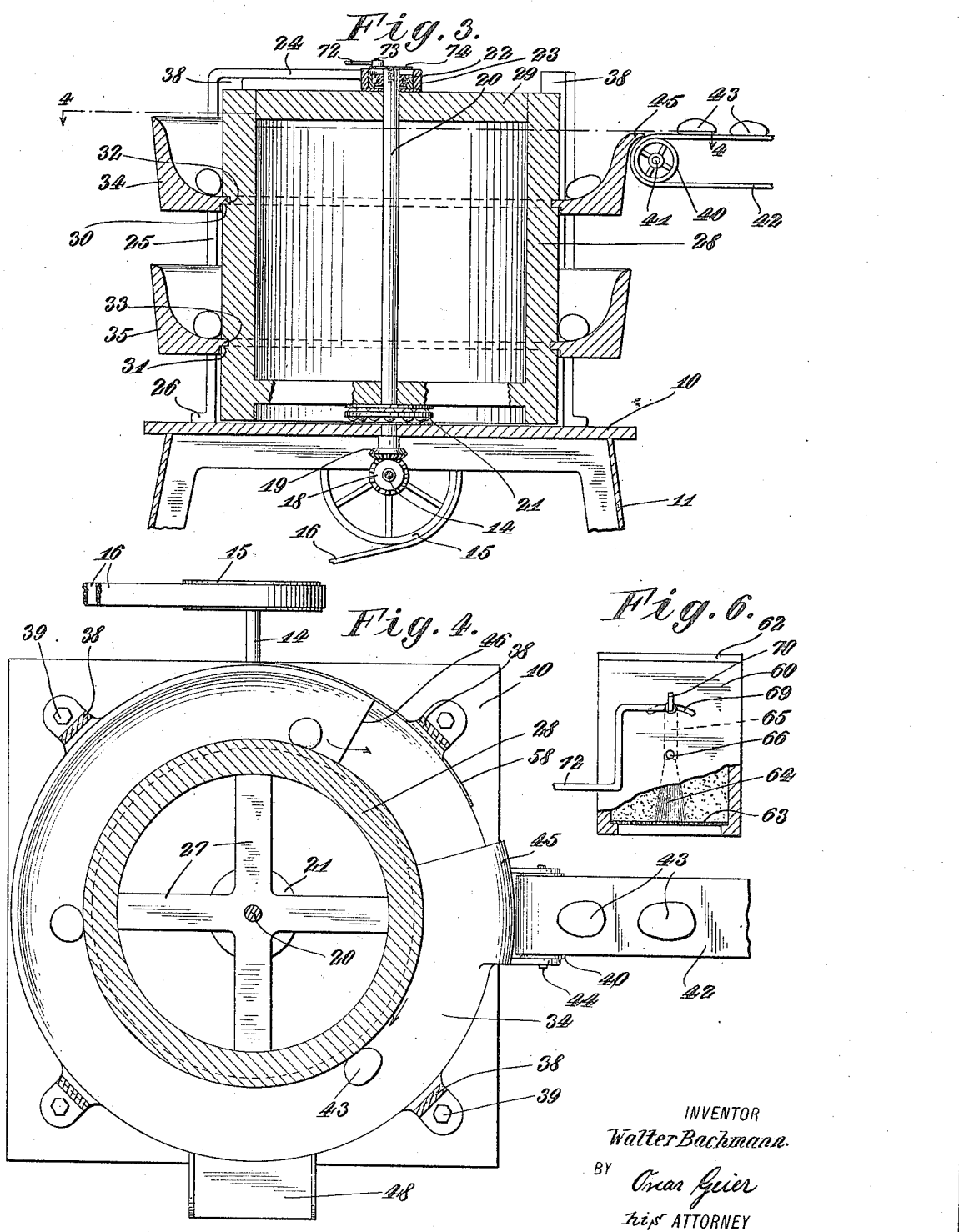

UNITED STATES PATENT OFFICE.

WALTER BACHMANN, OF NEW YORK, N. Y., ASSIGNOR TO HENRY RUDOLPH.

DOUGH-BALLER.

1,302,462.        Specification of Letters Patent.        Patented Apr. 29, 1919.

Application filed November 2, 1918. Serial No. 260,784.

*To all whom it may concern:*

Be it known that I, WALTER BACHMANN, a citizen of the United States, residing at New York, county of New York, and State of New York, have invented certain new and useful Improvements in Dough-Ballers, of which the following is a specification.

This invention relates to improvements in baker's machinery and particularly to types adapted to mold a plastic mass of dough into spherical shape for rolls and bread.

The principal object of the invention is to provide a machine into which the dough is entered in small portions at intervals, in a rough shape from a traveling conveyer, the machine being adapted to form the portions of dough into spherical shape, dredge the same with flour and to deliver in a finished condition.

A further object is to provide an apparatus which will automatically and continuously form dough into rolls or balls so long as it is fed, and without the necessity of contact with human hands in its operation.

These and other like objects, which will become more fully apparent as the specification progresses, are attained by the novel construction and combination of parts hereinafter described and shown in the accompanying drawings, forming a material part of this disclosure, and in which:—

Figure 1 is a perspective view showing a dough former made in accordance with the invention.

Fig. 2 is a side elevational view of the same.

Fig. 3 is a vertical sectional view taken on line 3—3 of Fig. 2.

Fig. 4 is a transverse sectional view taken on line 4—4 of Fig. 3.

Fig. 5 is a horizontal vertical sectional view taken on line 5—5 of Fig. 2, and

Fig. 6 is an end view partly in section of the dredging device.

The base of the machine is comprised of a flat rectangular plate 10, supported by legs 11 at the corners, resting upon any suitable foundation, support brackets 12, secured to the lower side of the plate 10, act as journals for a horizontal shaft 14, having upon its extending outer end a drive pulley 15 over which runs a belt 16 from any convenient source of power.

The inner end of the shaft 14, adjacent to the inner bearing, has secured upon it a bevel gear 18 meshing with a mating bevel gear 19 fixed upon the lower end of a vertical shaft 20, guided by an enlarged annular step ball-bearing 21 at the bottom and passing through a similar but smaller annular ball-bearing 22 at the top, the same rotating within a fixed cylindrical element 23 supported by an arm 24, having a downwardly turned portion 25, terminating in a flange 26 bolted to the top of the plate 10.

Guided by the vertical shaft 20 and fixed upon the lower annular bearing 21, are four radiating arms 27, their outer ends being rigidly engaged within a cylinder 28, closed by the cover 29 at its upper end, the arrangement being such that the cylinder 28 is rotated when power is communicated to the shaft 20.

Formed in the circumference of the cylinder 28, are two annular recesses 30 and 31, respectively upper and lower, and rotatably engaged therein are the corresponding edges 32 and 33, of circumjacent rings 34 and 35, each of which are cup shaped presenting a concavo-convex profile extending from the extreme upper outer edge to the inner engaged edges, these rings being supported and secured by lugs 37 to four equally disposed corner posts 38 secured to the plate 10 by the bolts 39, the arrangement being such that the rings guide the dough portions, causing them to make contact with the face of the cylinder while the inclosed edges 32 and 33 effectually prevent the passage of dough past the cylinder, thus avoiding loss.

Arranged contiguous to the machine is a wide faced pulley or roller 40. rotatably mounted upon a shaft 41, supported in any convenient manner and over which is trained an endless belt or conveyer 42, adapted to receive small batches of dough 43, from a mixing and dividing device (not shown) and deliver these batches over the sharp front extending edge 45 of the uppermost ring 34, where it will naturally slide down the inclined inner surface until it comes in contact with the rapidly revolving cylinder 28, causing the dough to rotate and assume a spherical form, eventually dropping over the edge 46 to the lower ring 35 where the rolling process, between the inner curved surface of the ring 35 and periphery of the cylinder 28, is continued until the dough balls arrive at the inclined chute 48, from whence they are delivered to another traveling conveyer 50 trained over a drum 51 mounted upon a shaft 52 and by which they are conveyed to a point for further disposal, the balls delivered from the upper ring 34 being guided by a fixed curved plate 58 so as to prevent them from falling to the floor.

A hollow casing 60 is secured by the supports 61, to one of the vertical posts 38, the same having a removable cover 62, and a perforate bottom 63 adapted to act in the manner of a sieve to distribute the flour contained within the casing 60, and which is constantly agitated by the movement of a plurality of brush tufts 64, the same being secured in a backing or block 65, pivoted upon the pin 66, contained in the casing 60, there being secured to the upper portion of the block 65, an arm 68, passing through an arcuate slot 69 formed in the one of the ends of the casing 60, the upturned ends 70, of the arm engaging with a somewhat elastic connecting rod 72 adapted to bend a little, its opposite end being in turn connected with a crank pin 63 set in the top of the disk 74, rigidly secured to the extreme upper end of the vertical shaft 20.

Thus the agitating brush 64 is kept in constant movement, causing the flour to pass through the sieve upon the inner portion of the fixed rings 34 and balls of dough as they are passed therebelow.

In operation, after the dough has been divided into desired portions in any convenient manner the lumps are placed upon the conveyer 42, and sent forward so as to engage with the extending element 45 of the upper ring 34.

Upon entering the same the dough balls are caused to be rotated, due to their frictional contact with the rotating cylinder 28, until they have reached the step 46, by which they drop by gravity to the lower fixed ring 35, where their shape is further perfected until delivered out of the chute 48 upon the traveling conveyer 52.

From the foregoing it will be seen that the dough balls are rolled into a spherical form without contact with the hands and in an expeditious and cleanly manner; also that the articles can be dredged with flour as they are rolled along in such manner as to prevent loss of the flour, a sufficient quantity being provided to prevent adherence of the dough balls to one another preliminary to their discharge from the machine.

Having thus described my invention, what I claim as new and desire to secure by Letters Patent, is:—

1. In a machine for forming plastic articles into spheres, the combination of a support, a vertical shaft rotatably mounted therein, and means for rotating said shaft, of a cylinder carried by said shaft, one or more rings circumjacent to said cylinder, said rings being stationary and having concavo-convex inner surfaces, means for delivering portions of the plastic material to the uppermost of said rings, means permitting passage of said material from the upper ring to the next adjacent ring, means for delivering a finished sphere from the lowermost of said rings, and means for conveying the finished spheres outwardly from said machine.

2. In a machine for forming balls of plastic material, the combination of a rotatable vertical cylinder, stationary rings set closely circumjacent thereto, said rings having interior faces adapted to project the material into intimate contact with the periphery of said revolving cylinder, means for delivering plastic material in limited separate quantities to the uppermost of said rings, means for dredging said material on the uppermost of said rings, said upper ring having an opening through which the balls of plastic material when in a semi-finished condition may drop to successive rings, and means permitting the discharge of the finished product from the lowermost of said rings outwardly of said machine.

3. In a machine for forming plastic material into spherical shape, the combination of a frame, a vertical cylinder revolubly mounted thereon, and means for rotating said cylinder, of posts extending upward from said frame; rings fixedly engaged with said posts, said rings having a portion engageable within annular recesses formed in the periphery of said cylinder and having a concave inner surface adapted to present the plastic material to the action of said cylinder, means for delivering the plastic material in independent adjusted quantities to the uppermost of said rings, means permitting the material in a partially formed condition to pass from the upper to lower ring, means preventing articles falling from said ring to the floor during their passage and a chute fixed in the lower of said stationary rings adapted to deliver the spherical articles outwardly from the machine.

4. In a machine for forming plastic material into spherical shapes, the combination of a support frame, a cylinder revolubly mounted thereon, a plurality of rings having a portion engaging with annular recesses in the periphery of said cylinder, said rings having a concavo-convex inner face adapted to press material entered therein against the revolving periphery of said cylinder, means for delivering material to the uppermost of said rings, a dredging box over said rings, means operated by the upper end of said shaft for agitating said dredging box, a guide arranged contiguous to the uppermost of said ring adapted to deliver a semi-finished product to the lower ring, and a chute fixed in the lowermost of said rings adapted to deliver the complete product outwardly from said machine.

In testimony whereof I have affixed my signature.

WALTER BACHMANN.

Copies of this patent may be obtained for five cents each, by addressing the "Commissioner of Patents, Washington, D. C."